March 26, 1963
C. EVANCHA
3,082,455
COMBINED BROOM AND DUST PAN
Filed June 22, 1961
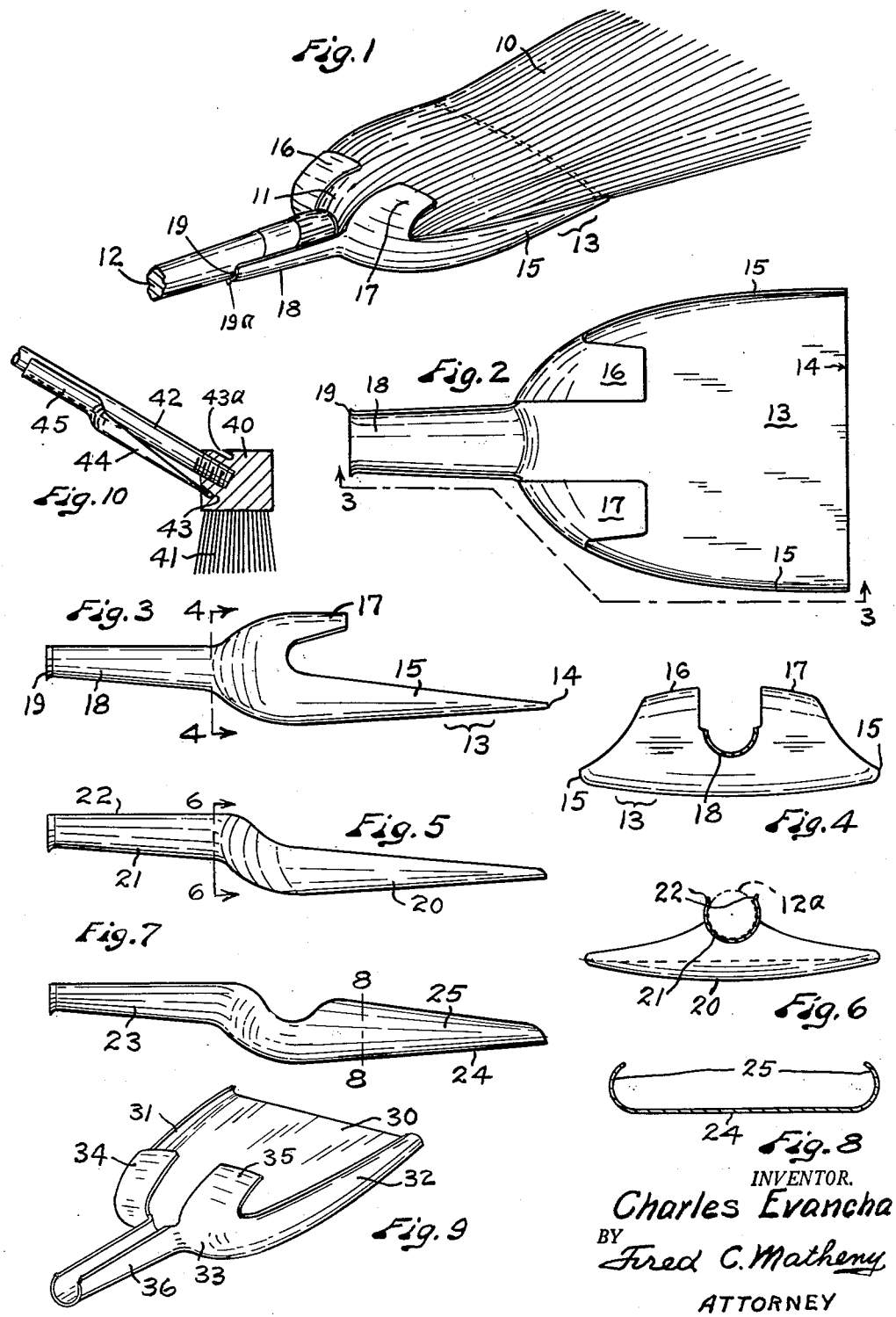
INVENTOR.
Charles Evancha
BY
Fred C. Matheny
ATTORNEY

United States Patent Office 3,082,455
Patented Mar. 26, 1963

3,082,455
COMBINED BROOM AND DUST PAN
Charles Evancha, Rte. 2, Arlington, Wash.
Filed June 22, 1961, Ser. No. 118,844
1 Claim. (Cl. 15—105)

My invention relates to a combined broom and dust pan in which a dust pan is removably supported on a broom.

An object of my invention is to provide a dust pan of light weight and simple construction which is shaped so that it can be quickly and easily applied to the brush portion and lower handle portion of a broom and can remain on and be carried by the broom without interfering with the use of the broom and can be quickly and easily removed from the broom when dust or trash is to be picked up, thus making it instantly available for use.

Another object is to provide a dust pan of inexpensive construction which can be made from a single piece of plastic material or metal.

Other objects of my invention will be apparent from the following description taken in connection with the accompanying drawings.

In the drawings FIGURE 1 is a perspective view of a modified dust pan, showing the same supported on a broom.

FIG. 2 is a detached top plan view of said dust pan.

FIG. 3 is a view in side elevation of said dust pan taken substantially on broken line 3—3 of FIG. 2.

FIG. 4 is a view partly in section and partly in end elevation of said dust pan taken substantially on broken line 4—4 of FIG. 3.

FIG. 5 is a view in side elevation of another modified form of dust pan.

FIG. 6 is a view partly in section and partly in end elevation taken substantially on broken line 6—6 of FIG. 5.

FIG. 7 is a view in side elevation of another modified form of dust pan.

FIG. 8 is a cross section on line 8—8 of FIG. 7.

FIG. 9 is a perspective view of another modified form of dust pan.

FIG. 10 is a side elevation showing my invention of a dust pan and push broom.

In FIGS. 1 to 4, inclusive, 10 indicates the brush part of an ordinary broom, 11 are shoulders formed at the upper end of the brush part 10 and 12 is a slightly tapered broom handle secured in the usual way to the upper end of the brush part 10. My dust pan comprises a pan part 13 of a shape similar in outline to the shape of the upper half of the brush part 10 of the broom. Said pan part 13 has a straight outer or forward edge 14 capable of resting flatly on a floor to receive sweepings. Said pan part 13 also has upwardly curved shallow lateral edge portions 15 which receive and fit the lateral edges of the brush part 10 of the broom. The upper end of the pan 13 is shaped to fit snugly against the shoulders 11 on the upper end of the brush part 10 and is further provided with two spaced apart resilient broom engaging members 16 and 17 which are spaced from and are in opposed relation to the pan part 13 and are arranged so that the shouldered upper end of the brush part 10 of the broom can be received and will fit snugly between the pan part 13 and the members 16 and 17.

A dust pan handle 18 is provided on the upper end portion of the pan part 13. The handle 18 is of substantially semi-circular cross section and is of proper size and taper to fit snugly over the lower end part of the broom handle 12 which is connected with the brush part 10 of the broom. Preferably the upper end of the dust pan handle 18 terminates in an outwardly bent portion 19 which makes it easier to apply the handle 18 to the broom handle 12 and which further enables the user to maintain a better hand grip on the dust pan handle 18. Preferably a stop member 19a is rigid with the broom handle 12 and protrudes a short distance outwardly therefrom immediately above the position normally occupied by the upper end of the dust pan handle 18 to insure that the dust pan will not work upwardly on the broom handle 12. This stop member 19a can be a nail or a screw or a peg. It only protrudes a slight distance from the handle 12 and does not interfere seriously with the manual removal of the dust pan from the broom.

My dust pan can be quickly and easily attached to a broom by positioning the pan part 13 against the side of the broom with the tips of the broom engaging members 16 and 17 positioned above and clear of the shoulders 11 of the broom and then moving the dust pan downwardly toward and over the brush part 10 of the broom into a position as shown in FIG. 1, in which said members 16 and 17 extend over and firmly engage with the shoulder parts 11 of the broom. The part 13 of the dust pan is held firmly against the side of the broom 10 opposite to the members 16 and 17 and the dust pan handle 18 fits over and is held firmly against the broom handle 12. When thus positioned on a broom the dust pan snugly fits the broom and the broom can be used with the dust pan on it. At the same time the dust pan can always be quickly and easily removed to pick up sweepings by grasping the handle 18 and lifting it off of the broom.

FIGS. 5 and 6 disclose a modified form in which the previously described shoulder engaging members 16 and 17 are omitted, a pan part 20 similar to the previously described pan part 13 is provided, and a resilient dust pan handle 21 of modified trough shape, which is capable of being clipped onto and clinging to the broom handle, is provided. The uppermost edges 22 of the dust pan handle 21 are extended far enough so that said dust pan handle 21 is more than a semi-circle in cross section and said upper edges 22 will yieldingly engage with and clip onto a broom handle 12a of cylindrical cross section. This broom handle 12a is diagrammatically shown by dotted lines in FIG. 6. The material of which the dust pan handler is formed in resilient enough to firmly attach the dust pan to the broom handle 12a and yet leave it readily removable therefrom. The dust pan 20, 21, shown in FIGS. 5 and 6, can be applied to the broom by using pressure to snap the dust pan handle 21 over the broom handle 12a, preferably at a location of smaller broom handle diameter upwardly from the brush part of the broom, then sliding said dust pan 20, 21 downwardly far enough so that the pan part 20 fits snugly against the upper brush part of the broom. The dust pan 20, 21 can be quickly and easily removed from the broom in a similar manner by sliding it upwardly and then detaching it from the broom handle 12a.

In the modified form shown in FIGS. 7 and 8 the shoulder engaging members 16 and 17 disclosed in FIGS. 1 to 4 are omitted, the trough shaped dust pan handle 23 is substantially semi-cylindrical in cross sectional shape so that it snugly receives and fits over but does not clip onto a broom handle and the pan 24 is provided with fairly wide edge members 25 which are curved upwardly and inwardly so that they can be caused to hook over the lateral edges of the brush part of a broom and thereby serve as the sole means for attaching the dust pan to the broom. Said edge members 25 are engaged with a broom by placing the pan part 24 against the brush part of the broom and moving it downwardly until the curved edge members 25 fit snugly over the lateral edges of the brush part of the broom. Said dust pan 24, 25 is readily removable from the broom by lifting it upwardly and off of the broom.

The modified form shown in FIG. 9 combines, in a single dust pan, the broom attachment devices of all of the three previously described forms. Said FIG. 9 shows a pan part 30 having two opposed upwardly and inwardly extending curved lateral edge portions 31 and 32 capable of gripping the edges of the brush part of a broom. Also said pan part 30 has an upper or rear end 33 which is provided with two spaced apart resilient broom engaging members 34 and 35 similar to the previously described members 16 and 17. Said members 34 and 35 are spaced apart far enough to afford clearance for a broom handle and they function as holding devices by extending over and engaging with a side of the broom opposite to the side thereof which is engaged by pan part 30. Also said pan part 30 is provided with a trough shaped dust pan handle 36 which is enough greater than a semi-circle in cross section so that it is capable of functioning like the previously described dust pan handle 21, 22 in clipping onto and gripping a broom handle. The dust pan shown in FIG. 9 thus combines the three types of holding devices shown in the preceding FIGS. 1 to 8, inclusive, and provides a dust pan which very securely grips the broom to which it is applied and yet is readily removable therefrom.

FIG. 10 shows my invention comprising a dust pan attached to a push type broom of the form commonly used in warehouses and like commercial establishments. The broom shown in FIG. 10 comprises a straight bar shaped brush head 40 having a brush part 41 fixedly attached thereto and having a cylindrical broom handle 42 threaded into it or otherwise rigidly secured to it. Parts 40 and 41 constitute the brush portion of the broom shown in FIG. 10. The bar is herein illustrated as being provided with two longitudinally extending grooves 43 and 43a, one below and one above the point of attachment of the broom handle 42 with said bar 40. A dust pan 44 having a trough shaped handle 45 can be attached to the push broom shown in FIG. 10 by engaging the dust pan handle 45 like a spring clip over the broom handle 42 and positioning the tip of the pan part 44 in either one of the grooves 43 or 43a, depending on whether the dust pan is positioned below or above the handle 42. Obviously either one of the grooves 43 or 43a may be dispensed with if desired. Thus the dust pan 44, 45 can be firmly but readily removably attached to the push type broom shown in FIG. 10. The pan 44, 45, shown in FIG. 10, is substantially the same as the dust pan 20, 21 shown in FIGS. 5 and 6, the handle being of resilient material and being at least slightly more than a semi-circle in cross section and functioning like a spring clip in gripping the handle 42.

The foregoing description and accompanying drawings clearly disclose preferred embodiments of my invention but it will be understood that these disclosures are merely illustrative and that changes may be made within the scope of the following claim.

I claim:

A broom and dust pan combination comprising a broom handle; a bristle carrying cross bar secured to an end of said broom handle; pan tip receiving and engaging means carried by said bristle carrying cross bar; an approximately flat dust pan part having a wide straight tip portion; and a dust pan handle of resilient material fixed to said pan part, at least a portion of said dust pan handle being in the shape of an open clip which is open on one side and is adapted to resiliently fit and snap over and engage with the broom handle in removably attaching the dust pan to the broom with the tip of the pan part engaging with the pan tip engaging means of the cross bar of the broom.

References Cited in the file of this patent
UNITED STATES PATENTS

| | | |
|---|---|---|
| 681,303 | Dille | Aug. 27, 1901 |
| 1,189,051 | Brooks | June 27, 1916 |
| 2,255,715 | Samms | Sept. 9, 1941 |
| 2,553,727 | Schlutz | May 22, 1951 |